US012780158B2

(12) United States Patent
Lee

(10) Patent No.: US 12,780,158 B2
(45) Date of Patent: Nov. 3, 2026

(54) SLIP CONTROL DEVICE AND METHOD

(71) Applicant: HL MANDO CORPORATION, Pyeongtaek-si (KR)

(72) Inventor: GyuBaek Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 81 days.

(21) Appl. No.: 19/046,058

(22) Filed: Feb. 5, 2025

(65) Prior Publication Data

US 2025/0381940 A1 Dec. 18, 2025

(30) Foreign Application Priority Data

Jun. 14, 2024 (KR) ........................ 10-2024-0077347

(51) Int. Cl.
*B60T 8/176* (2006.01)

(52) U.S. Cl.
CPC ........... *B60T 8/176* (2013.01); *B60T 2250/04* (2013.01)

(58) Field of Classification Search
CPC ....... B60T 8/176; B60T 2250/04; B60T 8/172
See application file for complete search history.

(56) References Cited

U.S. PATENT DOCUMENTS

| | | | | | |
|---|---|---|---|---|---|
| 5,993,338 | A * | 11/1999 | Kato | G05B 13/0255 474/18 |
| 2023/0347748 | A1* | 11/2023 | Kurosawa | B60W 20/14 |

FOREIGN PATENT DOCUMENTS

| | | | |
|---|---|---|---|
| JP | 3473363 | B2 | 12/2003 |
| JP | 5130388 | B2 | 1/2013 |
| KR | 10-2023-0136429 | A | 9/2023 |

* cited by examiner

*Primary Examiner* — Xiao En Mo
(74) *Attorney, Agent, or Firm* — Studebaker Brackett PLLC

(57) ABSTRACT

The present embodiments relate to a slip control device and method. Specifically, a slip control device according to an embodiment may include a determiner configured to determine, in response to an input of a braking signal, a target slip rate for a wheel corresponding to the braking signal, an adjuster configured to adjust a gain of a switching term constituting a slip controller model based on a vehicle speed of a host vehicle, and a controller configured to generate a braking torque so that a slip rate of the wheel converges to the target slip rate based on the slip controller model.

20 Claims, 9 Drawing Sheets

SLIP CONTROL DEVICE AND METHOD

CROSS REFERENCE TO RELATED APPLICATION

This application claims priority from Korean Patent Application No. 10-2024-0077347, filed on Jun. 14, 2024, which is hereby incorporated by reference for all purposes as if fully set forth herein.

TECHNICAL FIELD

An embodiment of the present disclosure relates to a slip control device and a slip control method for controlling a slip of a wheel.

BACKGROUND

In general, electronic control systems for improving safety during vehicle driving include an Anti-lock Brake System (ABS) capable of preventing brake locking due to wheel slip, a Traction Control System (TCS) for controlling driving force or braking force to prevent wheel slip if a vehicle suddenly starts or accelerates, and an Electronic Stability Program (ESP) capable of stably controlling the vehicle's posture.

A slip phenomenon in which the vehicle wheels slip due to large braking force or the influence of the road surface during braking may occur if a slip rate (e.g., 100*(vehicle speed-wheel speed)/vehicle speed, unit: %) increases, and in the case of a 100% slip rate, the vehicle wheels may be locked (i.e., wheel lock) and the vehicle steering may be impossible.

Therefore, there have been developed the functions such as slip controllers that control the wheel speed to reduce the slip rate and ABS to prevent the wheel lock. Most of the conventional slip controllers uses a pattern controls based on PID control, and there is required a lot of manpower and time for development due to the large number of control tuning parameters.

Accordingly, there is required a method to control the slip rate of the wheel with a small number of parameters.

SUMMARY

Embodiments of the present disclosure are to provide a method of adjusting the slip rate of a wheel to reach a target slip rate by adjusting a switching term of a slip controller model.

In accordance with an aspect of the present disclosure, there may be provided a slip control device including a determiner configured to determine, in response to an input of a braking signal, a target slip rate for a wheel corresponding to the braking signal, an adjuster configured to adjust a gain of a switching term constituting a slip controller model based on a vehicle speed of a host vehicle, and a controller configured to generate a braking torque so that a slip rate of the wheel converges to the target slip rate based on the slip controller model.

In accordance with an aspect of the present disclosure, there may be provided a slip control method including a step of determining, in response to an input of a braking signal, a target slip rate for a wheel corresponding to the braking signal, a step of adjusting a gain of a switching term constituting a slip controller model based on a vehicle speed of a host vehicle, and a step of generating a braking torque so that a slip rate of the wheel converges to the target slip rate based on the slip controller model.

In accordance with an aspect of the present disclosure, there may be provided a slip control device including at least one memory storing computer program instructions, and at least one processor for executing the computer program instructions, wherein the at least one processor is configured to, determine, in response to an input of a braking signal, a target slip rate for a wheel corresponding to the braking signal, adjust a gain of a switching term constituting a slip controller model based on a vehicle speed of a host vehicle, and generate a braking torque so that a slip rate of the wheel converges to the target slip rate based on the slip controller model.

According to an embodiment of the present disclosure, according to the present disclosure, the slip control device and method may suppress or alleviate the chattering phenomenon occurring in the wheel by adjusting the gain of the switching term.

DETAILED DESCRIPTION

Figure 1:
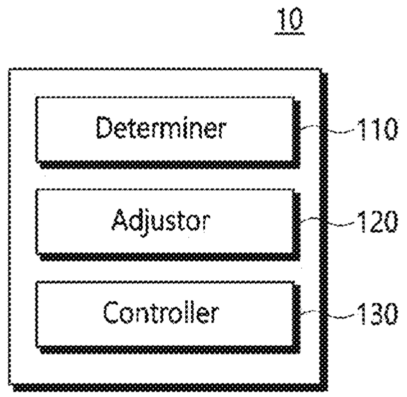
FIG. 1 is a block diagram schematically illustrating a slip control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a slip control device 10 according to an embodiment of the present disclosure with reference to the attached drawings.

FIG. 1 is a block diagram schematically illustrating a slip control device 10 according to an embodiment of the present disclosure.

Referring to FIG. 1, a slip control device 10 according to an embodiment may include a determiner 110, an adjuster 120, and a controller 130.

The slip control device 10 according to an embodiment may determine, in response to an input of a braking signal, a target slip rate for a wheel corresponding to the braking signal, may adjust a gain of a switching term constituting a slip controller model based on a vehicle speed of a host vehicle, and may generate a braking torque so that a slip rate of the wheel converges to the target slip rate based on the slip controller model.

The determiner 110 may determine a target slip rate for a wheel corresponding to the braking signal when a braking signal is input.

The braking signal may be received from a pedal displacement sensor of a brake pedal. Specifically, the brake pedal may detect a pedaling force of a driver. The brake pedal may include a pedal displacement sensor, and may transmit a pedal displacement information due to the driver's pedal operation as a braking signal to the slip control device (10).

The determiner 110 may determine a target slip rate corresponding to the pedal displacement. For example, the determiner 110 may obtain a target slip rate corresponding to the pedal displacement from a table composed of a pre-stored pedal displacement and a corresponding target slip rate. In addition, the determiner 110 may obtain a target slip rate from the table and adjust the target slip rate by considering the current vehicle speed, the distance to a front obstacle, etc.

The adjuster 120 may adjust a gain of the switching term constituting the slip controller model based on the vehicle speed of the host vehicle.

In some embodiments, each of the determiner 110, the adjuster 120, and the controller 130 includes one or more hardware processors.

Figure 2:
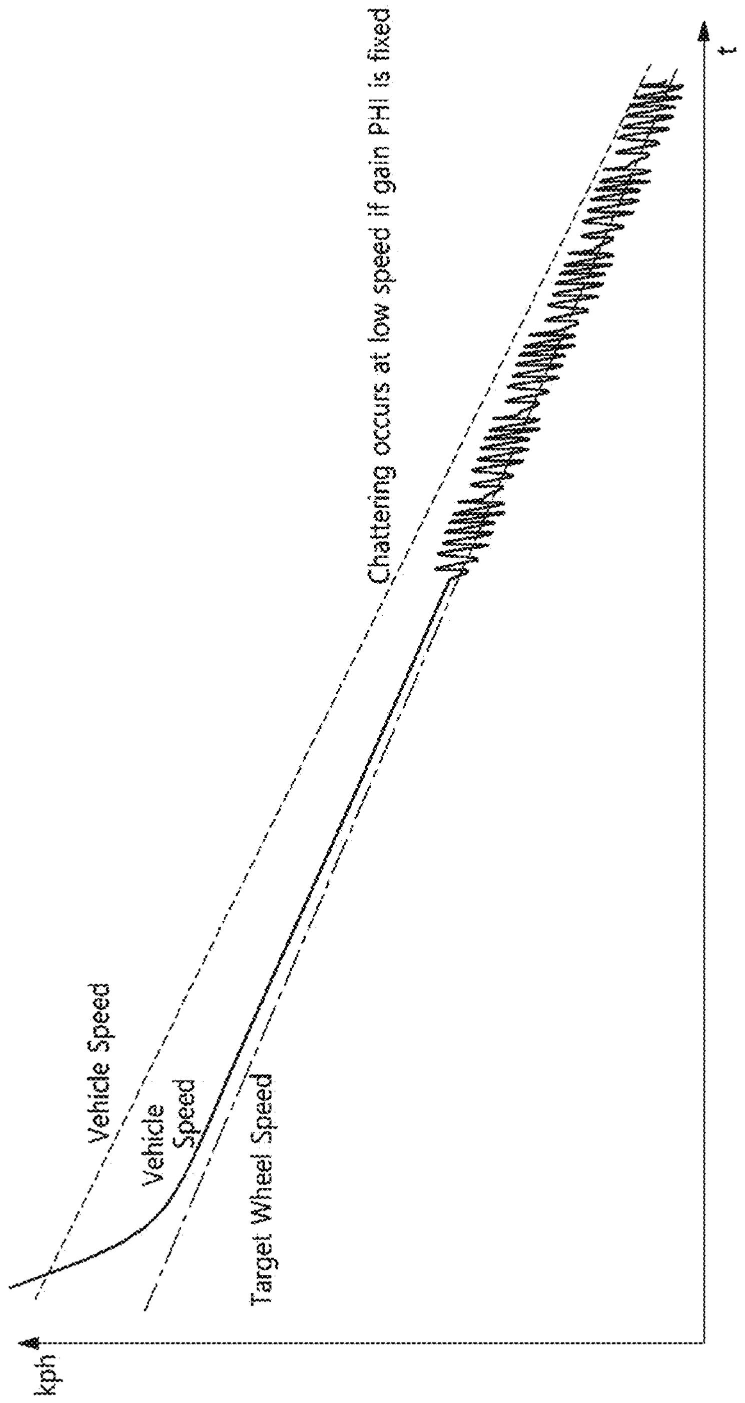
FIG. 2 illustrates a diagram for explaining the occurrence of a chattering phenomenon in a slip controller utilizing a general sliding mode control.

FIG. 2 illustrates a diagram for explaining the occurrence of a chattering phenomenon in a slip controller utilizing a general sliding mode control.

Referring to FIG. 2, a general slip controller may cause a chattering phenomenon in which a slip rate value of the vehicle wheel vibrates rapidly in the process of reaching the target slip rate. In order to solve the chattering phenomenon, there may be various method such as utilizing the acceleration of the wheel or additionally considering errors of other state variables of the vehicle. However, since all of these methods require complex mathematical calculations, it is difficult to apply these methods to an actual vehicle.

To compensate for this problem, the adjuster 120 may adjust the gain of the switching term of a slip controller.

Specifically, a slip controller model may be expressed as in FIG. 3 and Equation 1 below.

$$T = -\frac{\dot{v}I}{r}(1-\lambda) + Fr - \frac{vI}{r}ksat(s) \quad \text{[Equation 1]}$$

Figure 3:
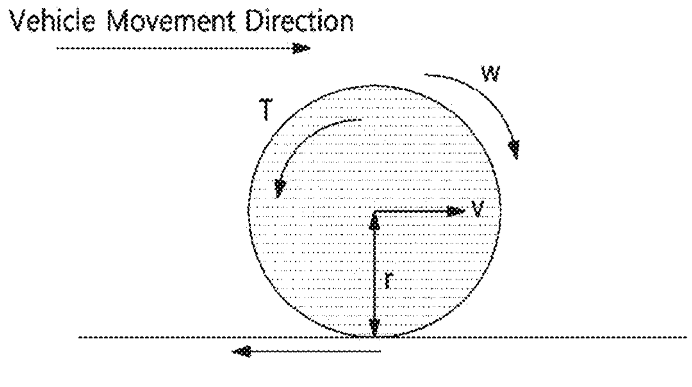
FIG. 3 is a diagram for explaining a slip controller model according to an embodiment.

FIG. 3 is a diagram for explaining a slip controller model according to an embodiment.

Referring to Equation 1 and FIG. 3, T may mean braking torque, F may mean longitudinal tire force, r may mean tire effective radius, v may mean vehicle speed, ω may mean wheel speed, s may mean sliding surface, k may mean switching gain, I may mean wheel rotational moment of inertia, and sat(s) may mean a switching term which is a saturation function.

The adjuster 120 may adjust the value of the switching term ksat(s). That is, the switching term may be a term for adjusting a wheel speed so that a slip rate reaches a target slip rate.

Figure 4:
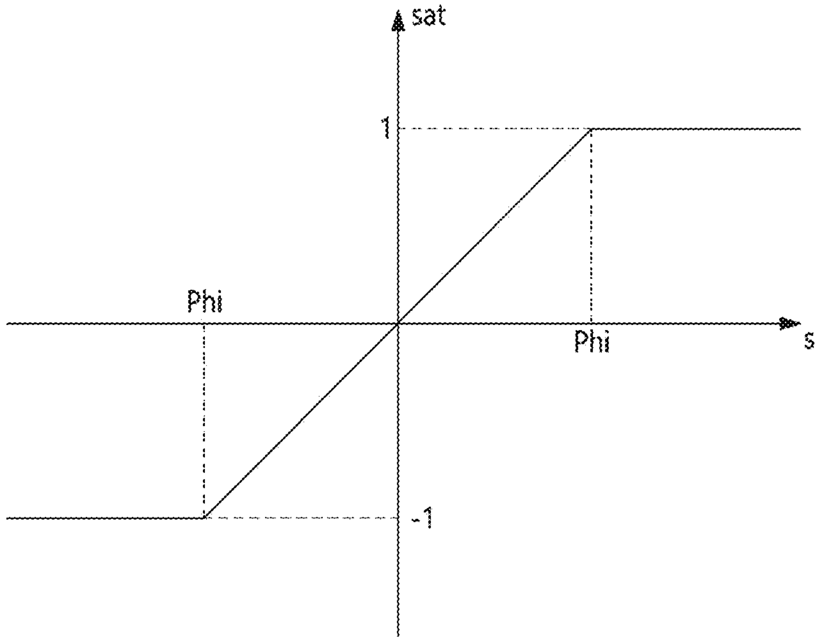
FIG. 4 is a diagram for explaining a phi value for adjusting the time for a wheel slip rate to reach a target slip rate according to an embodiment.

FIG. 4 is a diagram for explaining a phi value for adjusting the time for a wheel slip rate to reach a target slip rate according to an embodiment.

Referring to FIG. 4, the phi may be determined by a value of a slip surface, and may also be determined by a switching gain k in the switching term.

In this case, the slip surface may be expressed as in Equation 2 below.

$$s = \lambda - \lambda_d \quad \text{[Equation 2]}$$

Here, λ may represent a slip rate, and λd may represent a target slip rate.

In addition, Equations 1 and 2 may be applied with a Lyapunov function and may be expressed as Equation 3 below.

$$V = \frac{1}{2}s^2 \quad \text{[Equation 3]}$$

Therefore, the adjuster 120 may adjust the time for the slip rate of the wheel of the vehicle to reach the target slip rate by adjusting the switching gain k value.

As the value of phi decreases, there may be more sensitively to the target slip rate, so that the slip rate of the wheel may reach the target slip rate quickly, but a chattering phenomenon may occur. That is, as the value of phi increases, there may be less sensitive to the target slip rate, which delays the time in which the wheel slip rate reaches the target slip rate, but may reduce the occurrence of chattering.

That is, the switching term may cause the slip rate of the wheel reach the target slip rate faster as the gain decreases, and may cause the slip rate of the wheel reach the target slip rate slower as the gain increases.

Figure 5:
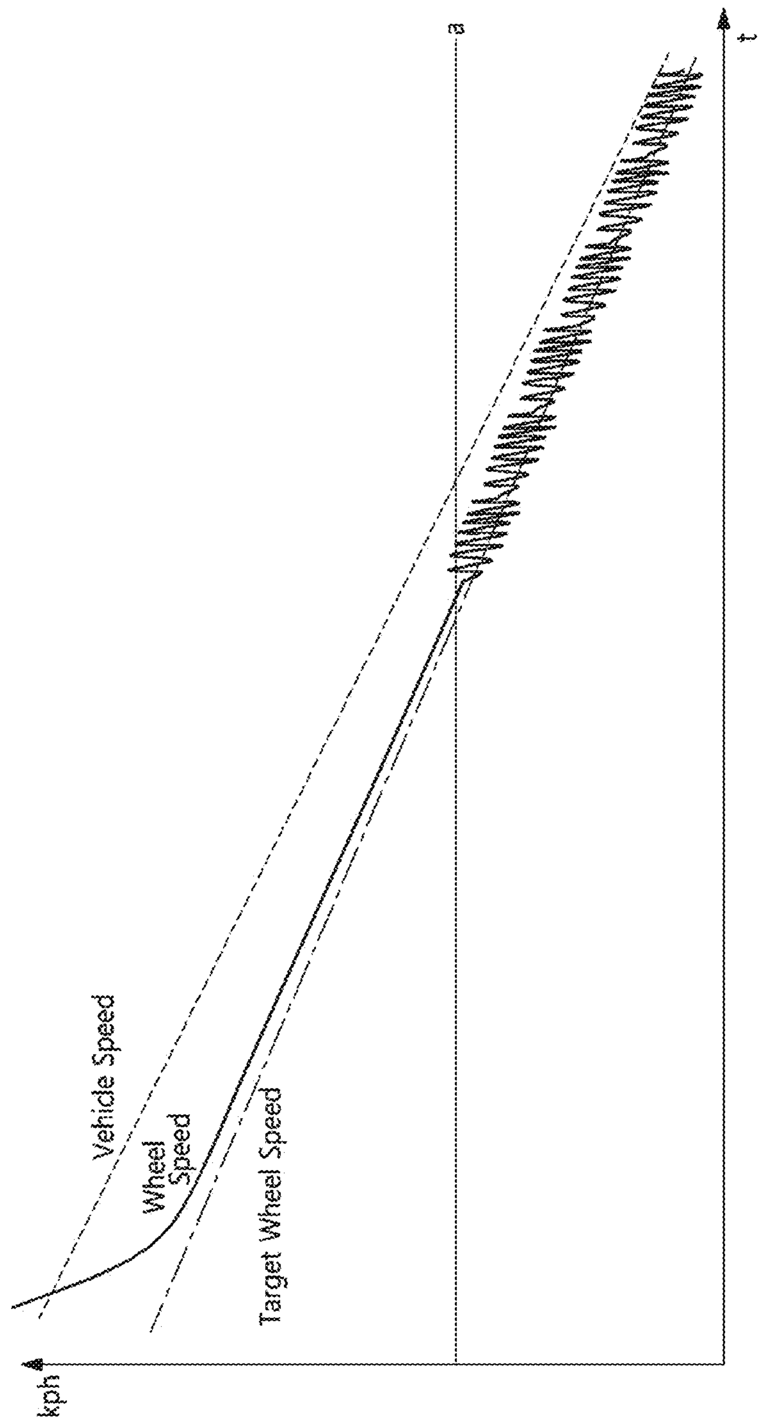
FIG. 5 is a diagram for explaining increasing a gain by setting a first reference value according to an embodiment.

FIG. 5 is a diagram for explaining increasing a gain by setting a first reference value according to an embodiment.

Referring to FIG. 5, the adjuster 120 may determine whether the vehicle speed of the host vehicle is smaller than or equal to a first reference value. And the adjuster 120 may increase the gain in response to a determination that the vehicle speed of the host vehicle is smaller than or equal to the first reference value.

Referring to FIG. 5, for example, the first reference value may be set to 'a' of FIG. 5. The first reference value may be set differently depending on the type of vehicle, the condition of a road surface, the condition of a braking device, etc.

Figure 6:
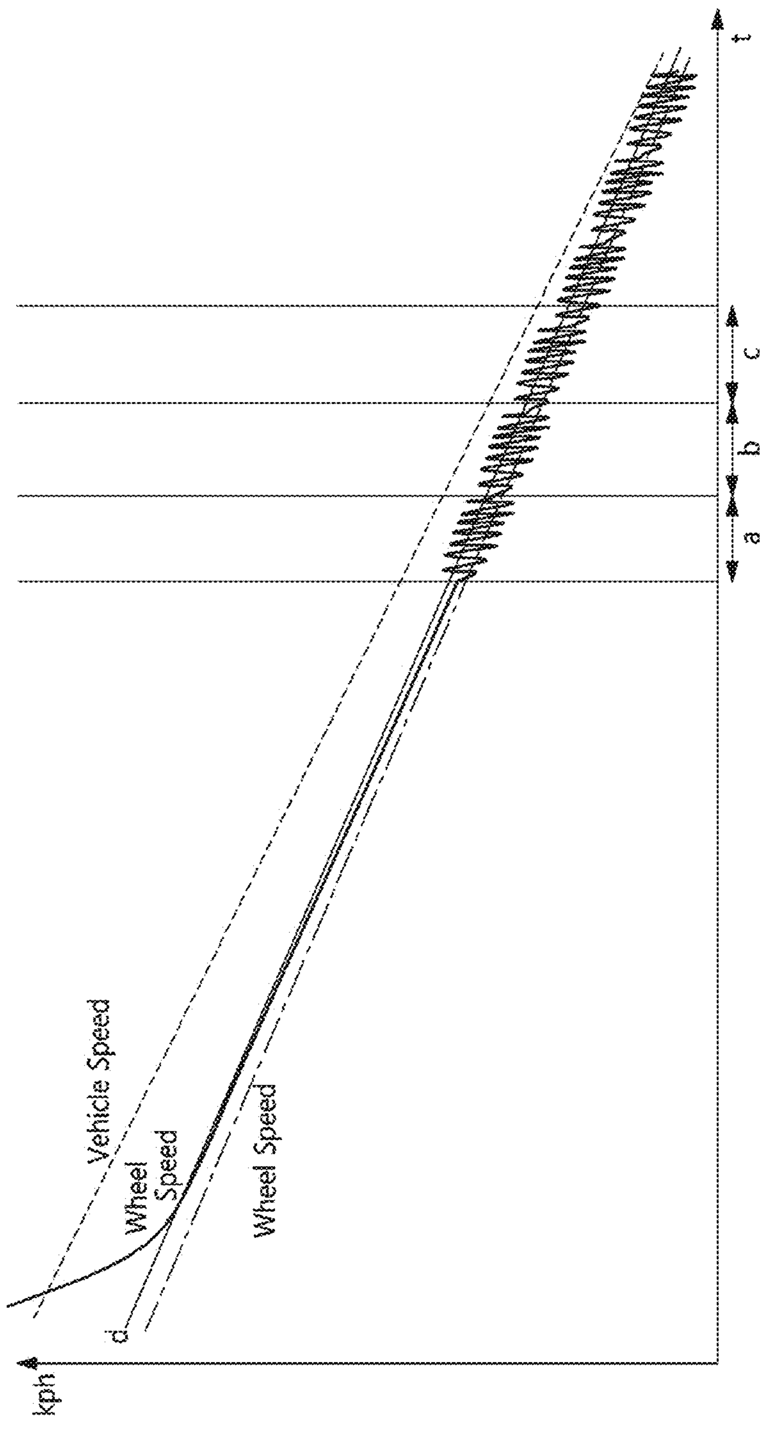
FIG. 6 is a diagram for explaining determining whether a chattering phenomenon occurs according to an embodiment.

FIG. 6 is a diagram for explaining determining whether a chattering phenomenon occurs according to an embodiment.

Referring to FIG. 6, the adjuster 120 may determine whether a chattering phenomenon occurs with respect to the slip rate based on a wheel speed, and may increase the gain if it is determined that the chattering phenomenon occurs.

The adjuster 120 may determine whether a difference between the wheel speed and a target wheel speed is greater than or equal to a threshold value for a predetermined period of time. The adjuster 120 may count the number of departures in response to a determination that the difference between the wheel speed and the target wheel speed is greater than or equal to the threshold value for the predetermined period of time. The adjuster 120 may determine whether the number of departures is greater than or equal to a second reference value. The adjuster 120 may determine that the chattering phenomenon occurs in the wheel speed in response to a determination that the number of departures is greater than or equal to the second reference value. For example, the threshold may be set to 'd' of FIG. 6.

In an example, the adjuster 120 may classify the number of departures into one of a plurality of sections, and may apply different gains to each classified section. For example, the adjuster 120 may count the number of departures in each of sections a, b, and c of FIG. 6, and may separately adjust the gain value according to the counted number of departures.

The adjuster 120 may apply a higher gain as the number of departures is counted higher.

If the number of departures is counted higher, there may mean that the chattering phenomenon is occurring more strongly, so the adjuster 120 may apply a higher gain to suppress the chattering phenomenon.

In another embodiment, the adjuster 120 may increase the gain based on a progress rate of the current slip rate to the target slip rate. Specifically, the adjuster 120 may determine a progress rate from the slip rate of the wheel to the target slip rate when determining the target slip rate. In addition, the adjuster 120 may increase the gain of the switching term according to the progress rate of the current slip rate toward the target slip rate. Therefore, since the adjuster 120 increases the gain as time passes, there may delay the time for the slip rate of the wheel to reach the target slip rate and suppress or reduce the chattering phenomenon.

As described above, the slip control device 10 of the present disclosure may suppress or alleviate the chattering phenomenon occurring when the vehicle under braking is at a low speed under various conditions.

In addition, since the present disclosure adjusts the time to reach the target slip rate, there may be omitted the additional mathematical calculations.

In one embodiment, the slip control device 10 may be implemented by an electronic control unit (ECU), a microcomputer, etc.

Figure 7:
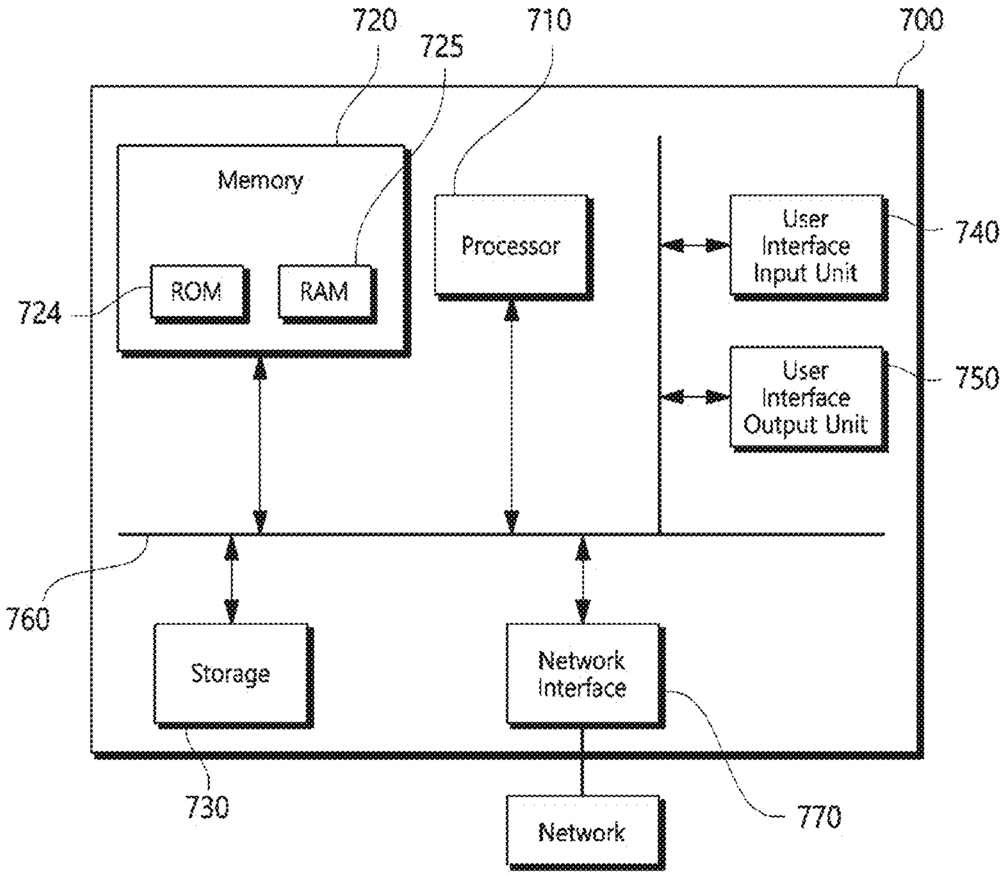
FIG. 7 is a block diagram of a slip control device according to another embodiment of the present disclosure.

FIG. 7 is a block diagram of a slip control device according to another embodiment of the present disclosure.

Figure 8:
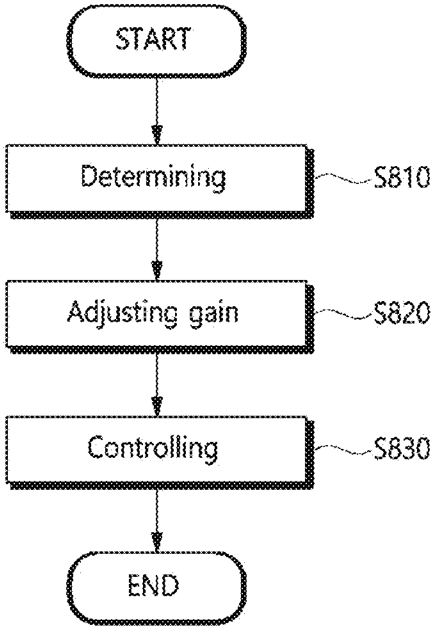
FIG. 8 is a flowchart for explaining a slip control method according to one embodiment of the present disclosure.

The embodiments of the present disclosure described above may be implemented in a computer system, for example, as a computer-readable recording medium. Referring to FIG. 8, a computer system 700, such as a sleep control device 10, may include at least one or more elements of a processor 710, a memory 720, a storage 730, a user interface input unit 740, and a user interface output unit 750, which may communicate with each other via a bus 960. In addition, the computer system 700 may also include a network interface 770 for connecting to a network. The processor 710 may be a CPU or a semiconductor device capable of executing processing instructions stored in the memory 720 and/or the storage 730. The memory 720 and the storage unit 730 may include various types of volatile/nonvolatile storage media. For example, the memory may include a ROM 724 and a RAM 725.

Hereinafter, it will be described a slip control method using a slip control device 10 capable of performing all of the above-described present disclosures.

FIG. 8 is a flowchart for explaining a slip control method according to one embodiment of the present disclosure.

Referring to FIG. 8, a sleep control method according to one embodiment of the present disclosure may include a determination step (S810) of determining a target slip rate for a wheel corresponding to a braking signal if a braking signal is input, a gain adjustment step (S820) of adjusting a gain of a switching term constituting a slip controller model based on a vehicle speed of a host vehicle, and a control step (S830) of generating a braking torque so that the slip rate of the wheel converges to the target slip rate based on the slip controller model.

Here, the switching term may mean a term which adjusts the wheel speed so that a slip rate reaches a target slip rate. Specifically, the switching term may include a gain phi as a tuning parameter, and the phi may be affected by the slippery surface. In addition, the smaller the phi value, there may be more sensitively to the target slip rate, so that the slip rate of the wheel may reach the target slip rate quickly. On the other hand, as the value of phi increases, there may be less sensitive to the target slip rate, which delays the time in which the wheel slip rate reaches the target slip rate. Referring to Equation 1, the size or level of the phi value may be adjusted by adjusting the k value, which is the gain of the switching term.

The gain adjustment step (S820) may determine whether the vehicle speed of the host vehicle is smaller than or equal to a first reference value. Since a chattering phenomenon may occur at low speed when the vehicle brakes, the gain adjustment step (S820) may increase the gain in response to a determination that the vehicle speed of the host vehicle is smaller than or equal to the first reference value in order to increase the phi value.

The gain adjustment step (S820) may determine whether a difference between the wheel speed and a target wheel speed is greater than or equal to a threshold value for a predetermined period of time. The gain adjustment step (S820) may count the number of departures in response to a determination that the difference between the wheel speed and the target wheel speed is greater than or equal to the threshold value for the predetermined period of time. The gain adjustment step (S820) may determine whether the number of departures is greater than or equal to a second reference value. The gain adjustment step (S820) may determine that the chattering phenomenon occurs in the wheel speed in response to a determination that the number of departures is greater than or equal to the second reference value.

The gain adjustment step (S820) may include a step of counting the number of departures if the difference between the wheel speed and the target wheel speed is greater than or equal to a threshold for a predetermined period of time, and determining that a chattering phenomenon has occurred in the wheel speed if the number of departures is greater than or equal to a second reference value.

The gain adjustment step (S820) may include a step of classifying the number of departures into one of a plurality of sections and applying a different gain to each classified section. Here, the sections may be classified based on time, and each section may have a predetermined time period. However, the present disclosure is not limited thereto, and the classified or divided time sections may be defined differently depending on the braking distance, the progress rate of the current slip rate to the target slip rate, etc.

The gain adjustment step S820 may include applying a higher gain as the number of departures is higher.

According to a slip control device and method of embodiments of the present disclosure, it is possible to flexibly respond to the chattering phenomenon by applying different gain values depending on the degree of occurrence of the chattering phenomenon.

The gain adjustment step (S820) may include a step of adjusting the switching term so that the gain is reduced at predetermined time intervals.

The gain adjustment step (S820) may include a step of increasing the gain based on a progress rate of the current slip rate toward the target slip rate.

The switching term may make the slip rate of the wheel reach the target slip rate faster as the gain decreases, and may make the slip rate of the wheel reach the target slip rate slower as the gain increases.

As described above, according to the present disclosure, the slip control device and method may suppress or alleviate the chattering phenomenon occurring in the wheel by adjusting the gain of the switching term.

Hereinafter, it will be described a sleep control device implemented as a computing system capable of performing some or all of the embodiments described with reference to FIGS. 1 to 8 with reference to the drawings. A part of the above description may be omitted to avoid redundant description, and in this case, the omitted content may be substantially equally applied to the following description as long as it does not contradict the technical idea of the present disclosure.

Figure 9:
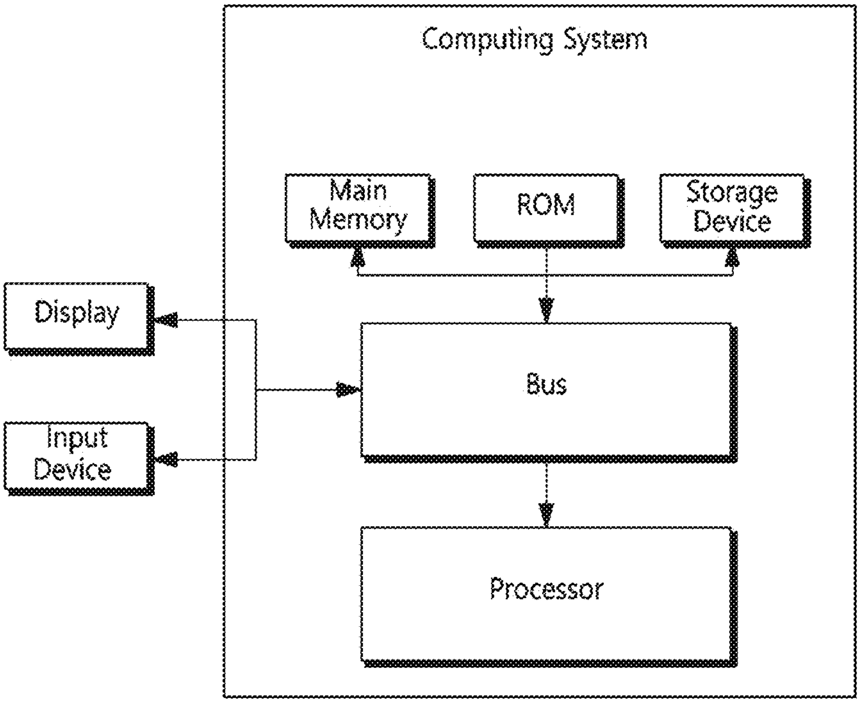
FIG. 9 is a block diagram of an exemplary computing system.

FIG. 9 is a block diagram of an exemplary computing system.

A sleep control device according to one embodiment of the present disclosure may include at least one memory storing computer program instructions, and at least one processor for executing the computer program instructions. In this case, at least one processor may determine, in response to an input of a braking signal, a target slip rate for a wheel corresponding to the braking signal, may adjust a gain of a switching term constituting a slip controller model based on a vehicle speed of a host vehicle, and may generate a braking torque so that a slip rate of the wheel converges to the target slip rate based on the slip controller model.

The computer system or computing device can include or be used to implement the system or its components such as the data processing system. The computing system includes a bus or other communication component for communicating information and a processor or processing circuit coupled to the bus for processing information. The computing system can also include one or more processors or processing circuits coupled to the bus for processing information. The computing system also includes main memory, such as a random access memory (RAM) or other dynamic storage device, coupled to the bus for storing information, and instructions to be executed by the processor. The main memory can be or include the data repository. The main memory can also be used for storing position information, temporary variables, or other intermediate information during execution of instructions by the processor. The computing system may further include a read-only memory (ROM) or other static storage device coupled to the bus for storing static information and instructions for the processor. A storage device, such a solid state device, magnetic disk or optical disk, can be coupled to the bus to persistently store information and instructions. The storage device can include or be part of the data repository.

The computing system may be coupled via the bus to a display, such as a liquid crystal display or active matrix display, for displaying information to a user. An input device, such as a keyboard including alphanumeric and other keys, may be coupled to the bus for communicating information and command selections to the processor. The input device can include a touch screen display. The input device can also include a cursor control, such as a mouse, a trackball, or cursor direction keys, for communicating direction information and command selections to the processor and for controlling cursor movement on the display. The display can be part of the data processing system, the client computing device or other component.

The processes, systems and methods described herein can be implemented by the computing system in response to the processor executing an arrangement of instructions contained in main memory. Such instructions can be read into main memory from another computer-readable medium, such as the storage device. Execution of the arrangement of instructions contained in main memory causes the computing system to perform the illustrative processes described herein. One or more processors in a multiprocessing arrangement may also be employed to execute the instructions contained in main memory. Hard-wired circuitry can be used in place of or in combination with software instructions together with the systems and methods described herein. Systems and methods described herein are not limited to any specific combination of hardware circuitry and software.

Although an example computing system has been described, the subject matter including the operations described in this specification can be implemented in other types of digital electronic circuitry, or in computer software, firmware, or hardware, including the structures disclosed in this specification and their structural equivalents, or in combinations of one or more of them.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system can include or share one or more data processing apparatuses, systems, computing devices, or processors A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDS, disks, or other storage devices). The operations described in this specification can be implemented as operations performed by a data processing apparatus on data stored on one or more computer-readable storage devices or received from other sources.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A slip control device comprising:

a determiner configured to determine, in response to an input of a braking signal, a target slip rate for a wheel corresponding to the braking signal;

an adjuster configured to adjust a gain of a switching term constituting a slip controller model, based on a vehicle speed of a host vehicle; and a controller configured to generate a braking torque so that a slip rate of the wheel converges to the target slip rate, based on the slip controller model.

2. The slip control device of claim 1, wherein the switching term is a term for adjusting a wheel speed so as for the slip rate to reach the target slip rate.

3. The slip control device of claim 1, wherein the adjuster is further configured to:

determine whether the vehicle speed of the host vehicle is smaller than or equal to a first reference value; and increase the gain in response to a determination that the vehicle speed of the host vehicle is smaller than or equal to the first reference value.

4. The slip control device of claim 1, wherein the adjuster is further configured to:

determine whether a chattering phenomenon occurs with respect to the slip rate based on a wheel speed; and increase the gain in response to a determination that the chattering phenomenon occurs.

5. The slip control device of claim 4, wherein the adjuster is further configured to:

determine whether a difference between the wheel speed and a target wheel speed is greater than or equal to a threshold value for a predetermined period of time;

count the number of departures in response to a determination that the difference between the wheel speed and the target wheel speed is greater than or equal to the threshold value for the predetermined period of time;

determine whether the number of departures is greater than or equal to a second reference value; and determine that the chattering phenomenon occurs in the wheel speed in response to a determination that the number of departures is greater than or equal to the second reference value.

6. The slip control device of claim 5, wherein the adjuster is further configured to:

classify the number of departures into one of a plurality of sections; and apply different gains to each classified section.

7. The slip control device of claim 6, wherein the adjuster is further configured to apply a higher gain as the number of departures is higher.

8. The slip control device of claim 1, wherein the adjuster is further configured to adjust the switching term so that the gain is decreased at predetermined intervals.

9. The slip control device of claim 1, wherein the switching term causes the slip rate of the wheel to reach the target slip rate faster as the gain decreases, and causes the slip rate of the wheel to reach the target slip rate slower as the gain increases.

10. The slip control device of claim 1, wherein the adjuster is further configured to increase the gain based on a progress ratio of the current slip rate toward the target slip rate.

11. A slip control method comprising:

determining, in response to an input of a braking signal, a target slip rate for a wheel corresponding to the braking signal;

adjusting a gain of a switching term constituting a slip controller model, based on a vehicle speed of a host vehicle; and generating a braking torque so that a slip rate of the wheel converges to the target slip rate, based on the slip controller model.

12. The slip control method of claim 11, wherein the switching term is a term for adjusting a wheel speed so as for the slip rate to reach the target slip rate.

13. The slip control method of claim 11, wherein the adjusting comprises:

determining whether the vehicle speed of the host vehicle is smaller than or equal to a first reference value; and increasing the gain in response to a determination that the vehicle speed of the host vehicle is smaller than or equal to the first reference value.

14. The slip control method of claim 11, wherein the adjusting comprises:

determining whether a chattering phenomenon occurs with respect to the slip rate based on a wheel speed; and increasing the gain in response to a determination that the chattering phenomenon occurs.

15. The slip control method of claim 14, wherein the adjusting comprises:

determine whether a difference between the wheel speed and a target wheel speed is greater than or equal to a threshold value for a predetermined period of time;

counting the number of departures in response to a determination that the difference between the wheel speed and the target wheel speed is greater than or equal to the threshold value for the predetermined period of time;

determining whether the number of departures is greater than or equal to a second reference value; and determining that the chattering phenomenon occurs in the wheel speed in response to a determination that the number of departures is greater than or equal to the second reference value.

16. The slip control method of claim 15, wherein the adjusting comprises:

classifying the number of departures into one of a plurality of sections; and applying different gains to each classified section.

17. The slip control method of claim 16, wherein the adjusting comprises: applying a higher gain as the number of departures is higher.

18. The slip control method of claim 11, wherein the adjusting comprises: adjusting the switching term so that the gain is decreased at predetermined intervals.

19. The slip control method of claim 11, wherein the switching term causes the slip rate of the wheel to reach the target slip rate faster as the gain decreases, and causes the slip rate of the wheel to reach the target slip rate slower as the gain increases.

20. A slip control device comprising:

at least one memory storing computer program instructions; and at least one processor for executing the computer program instructions, wherein the at least one processor is configured to, determine, in response to an input of a braking signal, a target slip rate for a wheel corresponding to the braking signal;

adjust a gain of a switching term constituting a slip controller model, based on a vehicle speed of a host vehicle; and generate a braking torque so that a slip rate of the wheel converges to the target slip rate, based on the slip controller model.

* * * * *